US006268301B1

(12) United States Patent
Dalman et al.

(10) Patent No.: US 6,268,301 B1
(45) Date of Patent: Jul. 31, 2001

(54) BALLISTIC-RESISTANT ARTICLE AND PROCESS FOR MAKING THE SAME

(75) Inventors: David A. Dalman, Midland, MI (US); Charles P. Weber, Jr., Monroe, NC (US); Gregory J. LaCasse, Lancaster, PA (US)

(73) Assignee: Toyobo Co., Ltd. (JP)

( * ) Notice: Subject to any disclaimer, the term of this patent is extended or adjusted under 35 U.S.C. 154(b) by 0 days.

(21) Appl. No.: 07/857,000

(22) Filed: Mar. 25, 1992

(51) Int. Cl.$^7$ .................................................. D03D 15/00

(52) U.S. Cl. .......................... 442/217; 442/301; 428/911

(58) Field of Search .................................. 428/229, 245, 428/257, 258, 259, 911; 442/217, 301

(56) References Cited

U.S. PATENT DOCUMENTS

| | | |
|---|---|---|
| 2,697,054 | 12/1954 | Dietz et al. . |
| 2,816,578 | 12/1957 | Frieder et al. . |
| 3,179,553 | 4/1965 | Franklin . |
| 3,454,947 | 7/1969 | Wesch et al. . |
| 3,577,306 | 5/1971 | Baker et al. . |
| 3,577,836 | 5/1971 | Tamura . |
| 3,684,631 | 8/1972 | Dunbar . |
| 3,722,355 | 3/1973 | King . |
| 3,771,418 | 11/1973 | Gulbierz et al. . |
| 3,813,281 | 5/1974 | Burgess et al. . |
| 3,841,954 | 10/1974 | Lawler . |
| 3,958,276 | 5/1976 | Clausen . |
| 4,061,815 | 12/1977 | Poole, Jr. . |
| 4,079,161 | 3/1978 | Kile . |
| 4,179,979 | 12/1979 | Cook et al. . |
| 4,181,768 | 1/1980 | Severin . |
| 4,186,648 | 2/1980 | Clausen et al. . |
| 4,200,677 | 4/1980 | Bottini et al. . |
| 4,292,882 | 10/1981 | Clausen . |
| 4,309,487 | 1/1982 | Holmes . |
| 4,403,012 | 9/1983 | Harpell et al. . |
| 4,457,985 | 7/1984 | Harpell et al. . |
| 4,473,653 | 9/1984 | Rudoi . |
| 4,483,020 | 11/1984 | Dunn . |
| 4,501,856 | 2/1985 | Harpell et al. . |
| 4,507,802 | 4/1985 | Small . |
| 4,510,200 | 4/1985 | Samowich . |
| 4,522,871 | * 6/1985 | Armellino, Jr. et al. ............ 428/252 |
| 4,529,640 | 7/1985 | Brown et al. . |
| 4,530,111 | 7/1985 | Barron et al. . |
| 4,539,253 | * 9/1985 | Hirschbuehler et al. ............ 428/229 |
| 4,550,044 | 10/1985 | Rosenberg et al. . |
| 4,574,105 | * 3/1986 | Donovan ............................... 428/233 |
| 4,579,885 | 4/1986 | Domeier et al. . |
| 4,604,319 | 8/1986 | Evans et al. . |
| 4,608,404 | 8/1986 | Gardner et al. . |
| 4,613,535 | 9/1986 | Harpell et al. . |
| 4,623,574 | 11/1986 | Harpell et al. . |
| 4,633,528 | 1/1987 | Brandt . |
| 4,633,756 | 1/1987 | Rudoi . |
| 4,639,387 | 1/1987 | Epel . |
| 4,648,136 | 3/1987 | Higuchi . |
| 4,650,710 | 3/1987 | Harpell et al. . |
| 4,660,223 | 4/1987 | Fritch . |
| 4,661,559 | 4/1987 | Gardner et al. . |
| 4,678,702 | 7/1987 | Lancaster et al. . |
| 4,732,803 | 3/1988 | Smith, Jr. . |
| 4,737,401 | 4/1988 | Harpell et al. . |
| 4,737,402 | 4/1988 | Harpell et al. . |
| 4,748,996 | 6/1988 | Combier . |
| 4,760,106 | 7/1988 | Gardner et al. . |
| 4,774,724 | 10/1988 | Sacks . |
| 4,835,246 | 5/1989 | Tsai et al. . |
| 4,850,050 | 7/1989 | Droste et al. . |
| 4,876,941 | 10/1989 | Barnes et al. . |
| 4,879,165 | 11/1989 | Smith . |
| 4,883,700 | 11/1989 | Harpell et al. . |
| 4,892,921 | 1/1990 | Tsai et al. . |
| 4,900,806 | 2/1990 | Arnold et al. . |
| 4,912,246 | 3/1990 | Lysenko et al. . |
| 4,953,234 | * 9/1990 | Li et al. .................................... 2/412 |
| 4,960,853 | 10/1990 | Arnold et al. . |
| 4,960,854 | 10/1990 | Arnold et al. . |
| 4,960,858 | 10/1990 | Arnold et al. . |
| 4,963,428 | 10/1990 | Harvey et al. . |
| 4,982,001 | 1/1991 | Lysenko et al. . |

(List continued on next page.)

FOREIGN PATENT DOCUMENTS

| | | |
|---|---|---|
| 0415276 | 8/1989 | (EP) . |
| 2258294A | 2/1993 | (GB) . |
| 9214608 | 9/1992 | (WO) . |

OTHER PUBLICATIONS

J. F. Wolfe in "Polybenzothiazoles and Polybenzoxazoles," J. Wiley & Sons, *Encyclopedia of Polymer Science and Engineering,* vol. 11, pp. 601–635.

H.D.D. Ledbetter et al., in "An Integrated Laboratory Process for Preparing Rigid Rod Fibers from Monomer." *Materials Research Society Symposium Proceedings,* Nov. 28, 1988, Boston, Massachusetts, U.S.A., pp. 247–264.

Development of Improved Lightweight Ballistic Armor, J. V. E. Hansen, Natick Research & Development Center, pp. 26–32 (Apr. 1984).

Investigation Of High Performance Fibers For Ballistic Impact Resistance Potential, P.M. Cunniff, et al., 21st International SAMPE Technical Conference, Sep. 25–28, 1989, pp. 840–849.

High Performance Organic Fibers, Fabrics And Composites For Soft And Hard Armor Applications, C. L. Segal, 23rd International SAMPE Technical Conference, Oct. 21–24, 1991, pp. 651–660.

Selected Requirements for High Performance Textiles in the Military, T.H. Tassinari, Hi–Tech Textiles, Jun. 1992 Conference.

*Primary Examiner*—Elizabeth M. Cole
(74) *Attorney, Agent, or Firm*—Morrison & Foerster LLP

(57) ABSTRACT

Ballistic-resistant articles comprise a plurality of polybenzoxazole or polybenzothiazole polymer fibers and are lighter, more comfortable to wear and exhibit better ballistic-resistant properties than existing ballistic-resistant articles of equal weight.

2 Claims, No Drawings

U.S. PATENT DOCUMENTS

| | | |
|---|---|---|
| 4,987,033 | 1/1991 | Abkowitz et al. . |
| 5,001,217 | 3/1991 | Tsai et al. . |
| 5,003,035 | 3/1991 | Tsai et al. . |
| 5,020,157 | 6/1991 | Dyer . |
| 5,059,467 | 10/1991 | Berkovitz . |
| 5,060,311 | 10/1991 | Meissner et al. . |
| 5,072,453 | 12/1991 | Wider . |
| 5,073,985 | 12/1991 | Stone et al. . |
| 5,087,516 | 2/1992 | Groves . |
| 5,102,723 * | 4/1992 | Pepin ................................. 428/223 |
| 5,110,661 | 5/1992 | Groves . |
| 5,112,667 | 5/1992 | Li et al. . |
| 5,185,195 | 2/1993 | Harpell et al. . |
| 5,196,259 * | 3/1993 | Pierini et al. ....................... 428/245 |
| 5,233,821 * | 8/1993 | Weber, Jr. et al. .................. 428/911 |

\* cited by examiner

BALLISTIC-RESISTANT ARTICLE AND PROCESS FOR MAKING THE SAME

BACKGROUND OF THE INVENTION

The present invention relates to ballistic-resistant articles and process for making them.

Ballistic-resistant articles, such as bulletproof vests, helmets, structural members of helicopters and other military equipment, vehicle panels, briefcases, raincoats, aircraft luggage containers, military aircraft seats, gas turbine engine containment rings, military troop shelters, boot soles and other personal protective items, overwrapping or overbraiding of telephone electrical lines and aerospace wire and cable, and military electronic shelters containing high strength fibers, are known. Fibers conventionally used include aramids, such as poly(phenylenediamine terephthalamide), nylon fibers, glass fibers, graphite fibers and the like. Other suitable fibers as described in U.S. Pat. Nos. 4,623,574, 4,457,985 and 4,650,710 include ultra high molecular weight (UHMW) polyethylene, polypropylene or polyvinyl alcohol fibers.

Ballistic-resistant articles made of these known fibers are generally heavy and bulky and are, therefore, uncomfortable to wear. It would be desirable to provide ballistic-resistant articles which are lighter, more comfortable to wear and exhibit better ballistic-resistant properties than existing ballistic-resistant articles.

SUMMARY OF THE INVENTION

One aspect of the present invention is a ballistic-resistant article comprising a plurality of polybenzoxazole (PBO) or polybenzothiazole (PBT) polymer fibers.

A second aspect of the present invention is a laminate comprising multiple plies of PBO or PBT fabric and a matrix resin.

The ballistic-resistant articles of the present invention provide significantly improved ballistic protection than current materials of equal weight.

DETAILED DESCRIPTION OF THE INVENTION

The present invention uses a plurality of fibers of polybenzoxazole (PBO) or polybenzothiazole (PBT) polymers or copolymers thereof.

PBO, PBT and random, sequential and block copolymers of PBO and PBT are described in references such as Wolfe et al., Liquid Crystalline Polymer Compositions, Process and Products, U.S. Pat. No. 4,703,103 (Oct. 27, 1987); Wolfe et al., Liquid Crystalline Polymer Compositions, Process and Products, U.S. Pat. No. 4,533,692 (Aug. 6, 1985); Wolfe et al., Liquid Crystalline Poly(2,6-Benzothiazole) Compositions, Process and Products, U.S. Pat. No. 4,533,724 (Aug. 6, 1985); Wolfe, Liquid Crystalline Polymer Compositions, Process and Products, U.S. Pat. No. 4,533,693 (Aug. 6, 1985); Evers, Thermoxadatively Stable Articulated p-Benzobisoxazole and p-Benzobisthiazole Polymers, U.S. Pat. No. 4,359,567 (Nov. 16, 1982); Tsai et al., Method for Making Heterocyclic Block Copolymer, U.S. Pat. No. 4,578,432 (Mar. 25, 1986); 11 Ency. Poly. Sci. & Eng., Polybenzothiazoles and Polybenzoxazoles, 601 (J. Wiley & Sons 1988) and W. W. Adams et al., The Materials Science and Engineering of Rigid-Rod Polymers (Materials Research Society 1989), which are incorporated herein by reference.

The PBO or PBT polymer may contain AB-mer units, as represented in Formula 1(a), and/or AA/BB-mer units, as represented in Formula 1(b)

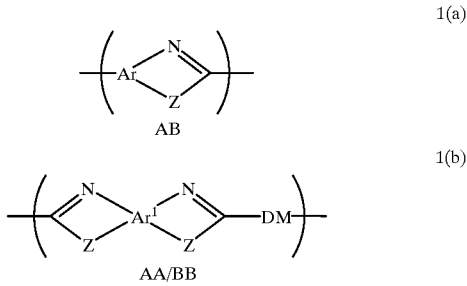

wherein:

Each Ar represents an aromatic group. The aromatic group may be heterocyclic, such as a pyridinylene group, but it is preferably carbocyclic. The aromatic group may be a fused or unfused polycyclic system, but is preferably a single six-membered ring. Size is not critical, but the aromatic group preferably contains no more than about 18 carbon atoms, more preferably no more than about 12 carbon atoms and most preferably no more than about 6 carbon atoms. Examples of suitable aromatic groups include phenylene moieties, tolylene moieties, biphenylene moieties and bisphenylene ether moieties. $Ar^1$ in AA/BB-mer units is preferably a 1,2,4,5-phenylene moiety or an analog thereof. Ar in AB-mer units is preferably a 1,3,4-phenylene moiety or an analog thereof.

Each Z is independently an oxygen or a sulfur atom.

Each DM is independently a bond or a divalent organic moiety that does not interfere with the synthesis, fabrication or use of the polymer. The divalent organic moiety may contain an aliphatic group, which preferably has no more than about 12 carbon atoms, but the divalent organic moiety is preferably an aromatic group (Ar) as previously described. It is most preferably a 1,4-phenylene moiety or an analog thereof.

The nitrogen atom and the Z moiety in each azole ring are bonded to adjacent carbon atoms in the aromatic group, such that a five-membered azole ring fused with the aromatic group is formed.

The azole rings in AA/BB-mer units may be in cis- or trans- position with respect to each other, as illustrated in 11 Ency. Poly. Sci. & Eng., supra, at 602, which is incorporated herein by reference.

The polymer preferably consists essentially of either AB-PBZ mer units or AA/BB-PBZ mer units, and more preferably consists essentially of AA/BB-PBZ mer units. The polybenzazole polymer may be rigid rod, semi-rigid rod or flexible coil. It is preferably rigid rod in the case of an AA/BB-PBZ polymer or semi-rigid in the case of an AB-PBZ polymer. Azole rings within the polymer are preferably oxazole rings (Z=0). Preferred mer units are illustrated in Formulae 2(a)–(g). The polymer more preferably consists essentially of mer units selected from those illustrated in 2(a)–(g), and most preferably consists essentially of a number of identical units selected from those illustrated in 2(a)–(c).

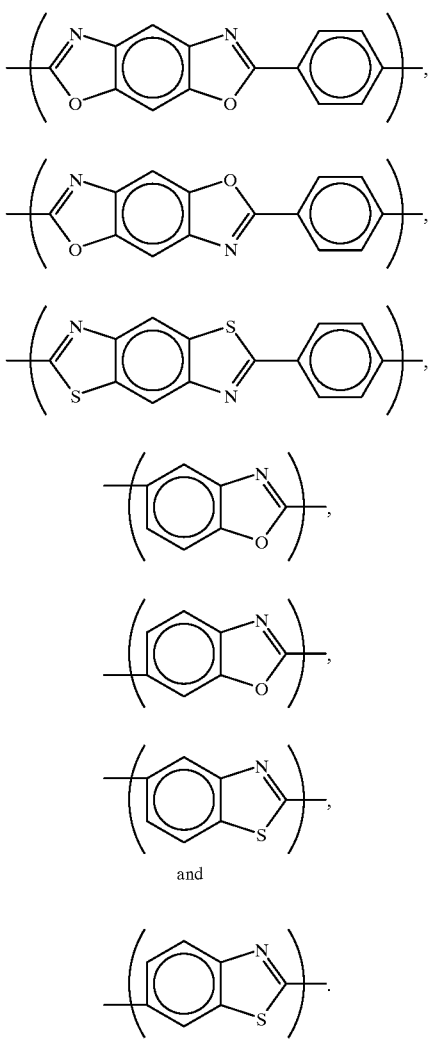

Each polymer preferably contains on average at least about 25 mer units, more preferably at least about 50 mer units and most preferably at least about 100 mer units. The intrinsic viscosity of rigid AA/BB-PBZ polymers in methanesulfonic acid at 25° C. is preferably at least about 10 dL/g, more preferably at least about 15 dL/g and most preferably at least about 20 dL/g. For some purposes, an intrinsic viscosity of at least about 25 dL/g or 30 dL/g may be best. Intrinsic viscosity of 60 dL/g or higher is possible, but the intrinsic viscosity is preferably no more than about 40 dL/g. The intrinsic viscosity of semi-rigid AB-PBZ polymers is preferably at least about 5 dL/g, more preferably at least about 10 dL/g and most preferably at least about 15 dL/g.

The polymer or copolymer is dissolved in a solvent to form a solution or dope. Some polybenz-oxazole and polybenzothiazole polymers are soluble in cresol, but the solvent is preferably an acid capable of dissolving the polymer. The acid is preferably non-oxidizing. Examples of suitable acids include poly-phosphoric acid, methanesulfonic acid and sulfuric acid and mixtures of those acids. The acid is preferably polyphosphoric acid and/or methanesulfonic acid, and is more preferably polyphosphoric acid.

The dope should contain a high enough concentration of polymer for the polymer to coagulate to form a solid article. When the polymer is rigid or semi-rigid, then the concentration of polymer in the dope is preferably high enough to provide a liquid crystalline dope. The concentration of the polymer is preferably at least about 7 weight percent, more preferably at least about 10 weight percent and most preferably at least about 14 weight percent. The maximum concentration is limited primarily by practical factors, such as polymer solubility and dope viscosity. The concentration of polymer is seldom more than 30 weight percent, and usually no more than about 20 weight percent.

Suitable polymers or copolymers and dopes can be synthesized by known procedures, such as those described in Wolfe et al., U.S. Pat. No. 4,533,693 (Aug. 6, 1985); Sybert et al., U.S. Pat. No. 4,772,678 (Sep. 20, 1988); Harris, U.S. Pat. No. 4,847,350 (Jul. 11, 1989); and Ledbetter et al., "An Integrated Laboratory Process for Preparing Rigid Rod Fibers from the Monomers," The Materials Science and Engineering of Rigid-Rod Polymers at 253–64 (Materials Res. Soc. 1989), which are incorporated herein by reference. In summary, suitable monomers (AA-monomers and BB-monomers or AB-monomers) are reacted in a solution of nonoxidizing and dehydrating acid under nonoxidizing atmosphere with vigorous mixing and high shear at a temperature that is increased in step-wise or ramped fashion from no more than about 120° C. to at least about 190° C. Examples of suitable AA-monomers include terephthalic acid and analogs thereof. Examples of suitable BB-monomers include 4,6-diaminoresorcinol, 2,5-diaminohydroquinone, 2,5-diamino-1,4-dithiobenzene and analogs thereof, typically stored as acid salts. Examples of suitable AB-monomers include 3-amino-4-hydroxybenzoic acid, 3-hydroxy-4-aminobenzoic acid, 3-amino-4-thiobenzoic acid, 3-thio-4-aminobenzoic acid and analogs thereof, typically stored as acid salts.

The dope is spun into high tensile strength fibers by known dry jet-wet spin techniques in which the dope is drawn through a spinneret into a coagulation bath. Fiber spinning and coagulation techniques are described in greater detail in Tan, U.S. Pat. No. 4,263,245 (Apr. 21, 1981); Wolfe et al., U.S. Pat. No. 4,533,693 (Aug. 6, 1985); and Adams et al., The Materials Science and Engineering of Rigid Rod Polymers, 247–49 and 259–60 (Materials Research Society 1989), which are incorporated herein by reference. Each fiber preferably has an average diameter of no more than about 50 $\mu$m and more preferably no more than about 25 $\mu$m. Minimum fiber diameter is limited by practical ability to spin. Average fiber diameters are seldom less than about 1 $\mu$m and usually at least about 7 $\mu$m. Smaller denier filaments ordinarily provide better dexterity, but cost more. The average tensile strength of the fiber is preferably at least about 1 GPa, more preferably at least about 1.75 GPa, more highly preferably at least about 2.75 GPa, and most preferably at least about 4.10 GPa.

The fibers may be heat-treated for added stiffness and for improving the properties of composites made therefrom. However, for certain applications, such as soft armor where greater stiffness is not usually required, the fibers are preferably not heat-treated.

The fibers may be grouped together to form a twisted or untwisted yarn or may be used as reinforcements for a random fiber composite.

Yarns may either be from staple or from continuous filaments. For a staple-based yarn, the fiber is cut or stretch-broken into short segments, such as about 1 inch to 12 inches in length. The short segments are spun according to ordinary yarn spinning procedures to obtain a yarn suitable for further processing. For a continuous filament-based yarn, a number of continuous filaments are held together by known means, such as twisting, entanglement or application of a finish or sizing agent. The twist for a twisted yarn can be between 2 and 20 turns per inch, depending primarily on the diameter of the yarn. Preferably, the continuous filaments are held together without twisting by lightly sizing them.

The optimum denier of the yarn varies depending upon the desired use and price of the fabric. For most purposes, the yarn is preferably at least about 50 denier, more preferably at least about 200 denier and most preferably at least about 500 denier. For most purposes, the yarn is preferably at most about 2000 denier, more preferably at most about 1500 denier and most preferably no more than about 1000 denier. For example, the preferred range of denier for soft armor applications is from 150 to 500 denier and the most preferred range is from 150–300 denier. The same denier yarns are also suitable for hard armor applications but higher denier yarns in the range of 500 to 1500 denier are preferred for economic reasons.

The yarn is preferably lubricated with an oil and an antistatic agent for further processing into a fabric. Advantageously, before the fabric is used for a ballistic application, the lubricant is scoured off to improve ballistic performance and also to improve adhesion of the yarn or fabric to the matrix of a composite hard armor. In other applications, a specific lubricant, for example, silicone, may be specifically added to provide a weak interaction with the matrix material in a hard armor. Examples of such applications include light weight riot shields, as well as gun turret armor for battle ship applications.

The yarn may be made into a fabric or article of clothing by known methods, such as knitting, weaving, braiding or forming into non-woven fabric. For instance, the yarn may be knitted on conventional knitting equipment useful for knitting other high-strength fibers, such as aramid fibers. Knitting techniques are well-known in the art and are described, for example, in Byrnes, U.S. Pat. No. 3,883,898 (May 20, 1975) and/or Byrnes, U.S. Pat. No. 3,953,893 (May 4, 1976). The yarns may be woven on any type of looms such as, for example, the rapier, shuttleless, shuttle, needle, air jet and water jet looms. Yarn that is woven into a plain piece of fabric may be cut and sewn to make garments according to known procedures. The polybenzazole fiber yarn may be too cut-resistant for cutting tools which are standard on commercial equipment. It may be necessary to improve the cutting equipment or cut by hand.

The fabric may be used alone or may be embedded in a matrix to form a rigid panel. The fabric may also be interlayered with an isotropic, oriented liquid crystalline PBO or PBT film, or layered in combination with p-aramid, UHMW polyethylene or glass fibers.

Suitable matrix materials include, but are not limited to, thermoplastic polymers such as polyethylene, polypropylene, nylon, polyimide, polyethyleneimine (PEI), polyetherether ketone (PEEK), polyether sulfone (PES), polycarbonate, polyethylene terephthalate (PET); thermosetting polymers such as vinyl ester, vinyl butyral, epoxy resin, PBO, PBT, polyurethanes, cyanate esters, phenolics and silicones; and elastomers such as polybutadiene, polyisoprene, natural rubber, ethylene-propylene copolymers, ethylene-propylene-diene terpolymers, polysulfide polymers, polyurethane elastomers, chlorsulfonated polyethylene, polychloroprene, plasticized polyvinylchloride using dioctyl phthalate or other plasticizers well known in the art, butadiene acrylonitrile elastomers, poly (isobutylene-co-isoprene), polyacrylates, polyesters, polyethers, fluoroelastomers, silicone elastomers, and thermoplastic elastomers, copolymers of ethylene.

The PBO fibers may be made into random fiber composites by cutting them into short lengths, such as, for example, from about 1 to about 12 inches, depending on specific end use and then orienting or randomly laying the cut fibers in a web to produce a felt-like material. A process for preparing fiber composites is described in U.S. Pat. No. 4,457,985, which is incorporated herein by reference.

The following U.S. Patents, which are incorporated herein by reference, describe garments and/or fabrics containing commingled or composite fibers and/or two types of fibers woven together: Byrnes, U.S. Pat. No. 4,004,295 (Jan. 25, 1977); Byrnes et al., U.S. Pat. No. 4,384,449 (May 24, 1983); Bettcher, U.S. Pat. No. 4,470,251 (Sep. 11, 1984); Kolmes, U.S. Pat. No. 4,777,789 (Oct. 18, 1988); Kolmes, U.S. Pat. No. 4,838,017 (Jun. 13, 1989); Giesick, U.S. Pat. No. 4,856,110 (Aug. 15, 1989); Robins, U.S. Pat. No. 4,912,781 (Apr. 3, 1990); Warner, U.S. Pat. No. 4,918,912 (Apr. 24, 1990) and Kolmes, U.S. Pat. No. 4,936,085 (Jun. 26, 1990), which are incorporated herein by reference.

ILLUSTRATIVE EXAMPLES

The present invention is illustrated more fully by the following Examples. The Examples are for illustrative purposes only, and should not be taken as limiting the scope of either the Specification or the Claims. Unless stated otherwise, all parts and percentages are by weight.

Example 1

A. Preparation of Ballistic-Resistant Fabric

A plurality of fibers are spun by conventional means from a dope containing about 10 to about 20 weight percent rigid rod cis-polybenzoxazole polymer in poly-phosphoric acid. The polymer has an intrinsic viscosity of between about 25 dL/g and about 40 dL/g as measured in methanesulfonic acid at about 30° C. The fibers are obtained from several runs and have the following range of properties: 14–20 dpf (denier per filament), 450 to 600 Ksi tensile strength, 18 to 25 Msi tensile modulus, and 1.5 to 2.5% elongation to break.

The fibers are formed into a continuous filament yarn having an average of about 450 to about 750 denier. Light weight knitting oil and an antistatic agent are applied to the tow as a lubricant. The yarn is twisted with 1.5 turns per inch on a Leesona ring twister having 5-inch rings.

The continuous filament yarn is woven into a fabric on a standard Rapier loom with a construction of 24×24 ends and picks in the warp and weft directions to obtain a fabric of 4 oz./sq. yard.

B. Ballistic Testing

The fabric prepared in Part A is cut into 8 inch squares. A hard armor test panel consisting of 8 of these 8 inch squares is constructed by placing a 4 mil thick film of low density polyethylene between each layer of fabric and compression molding these together under a pressure of 1000 psi and a temperature of 130° C. to form a plaque approximately 1.0 millimeter thick.

The test panel is securely clamped inside a wooden box frame backed by several layers of wood as a safety catch for any fragments which pass through the test panel. A piece of 1 inch glass fiber insulation batting is placed in front of the panel to deflect any rebounding projectiles. The panel is then shot with a 0.22 caliber revolver. The panel is shot at two locations, one in the center and one approximately 2 inches from a corner of the panel. In both cases, the slugs did not perforate the test panel.

COMPARATIVE EXAMPLE

A test plaque is prepared as in the above example except that the fabric is prepared from commercial grade Spectra™ 1000 high performance UHMW polyethylene fiber produced by Allied-Signal Corporation. The fabric is thicker than the fabric used in Example 1, having been made from higher denier yarn, resulting in a thicker test plaque. This fabric represents the best state of the art ballistic material for use in hard armor devices such as helmets. When shot in a similar way to that described in Example 1, the two 0.22 caliber slugs perforated the plaque.

What is claimed is:

1. A ballistic-resistant article which is resistant to penetration by a .22 caliber projectile, comprising a plurality of polybenzazole fibers woven with a second fiber.

2. The article of claim 1 wherein the second fiber is cotton, polyester, nylon or rayon.

* * * * *